(12) United States Patent
Chao

(10) Patent No.: US 6,170,948 B1
(45) Date of Patent: *Jan. 9, 2001

(54) EYEGLASS DEVICE HAVING AUXILIARY FRAME

(75) Inventor: David Yinkai Chao, Towson, MD (US)

(73) Assignee: Contour Optik Inc. (TW)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/847,708

(22) Filed: Apr. 28, 1997

(51) Int. Cl.$^7$ ................................................. G02C 9/00
(52) U.S. Cl. .................................. 351/47; 351/57
(58) Field of Search ............................ 351/44, 47, 57

(56) References Cited

U.S. PATENT DOCUMENTS

| | | | |
|---|---|---|---|
| 2,737,847 | 3/1956 | Tesauro | 351/41 |
| 2,752,764 | 11/1956 | Lederer | 63/29 |
| 2,770,168 | 11/1956 | Tesauro | 351/41 |
| 2,920,327 | 1/1960 | Singer | 2/14 |
| 3,498,701 | 3/1970 | Miller | 351/57 |
| 3,531,188 | 9/1970 | LeBlan et al. | 351/48 |
| 3,565,517 | 2/1971 | Gitlin et al. | 351/106 |
| 3,582,192 | 6/1971 | Gitlin et al. | 351/52 |
| 3,838,914 | 10/1974 | Fernandez | 351/106 |
| 4,070,103 | 1/1978 | Meeker | 351/52 |
| 4,196,981 | 4/1980 | Waldrop | 351/59 |
| 4,547,909 | 10/1985 | Bell | 2/431 |
| 4,875,654 | 10/1989 | Chandonnet et al. | 248/467 |
| 4,988,181 | 1/1991 | Riach | 351/52 |
| 5,181,051 | 1/1993 | Townsend et al. | 351/52 |
| 5,243,366 | 9/1993 | Blevins | 351/57 |
| 5,321,442 | 6/1994 | Albanese | 351/44 |
| 5,389,981 | 2/1995 | Riach | 351/158 |
| 5,410,763 | 5/1995 | Bolle | 2/436 |
| 5,416,537 | 5/1995 | Sadler | 351/57 |
| 5,642,177 | * 6/1997 | Nishioka | 351/47 |
| 5,737,054 | * 4/1998 | Chao | 351/47 |
| 1797366 | 1/1971 | (DE) . | |
| 85 07 761 | 6/1985 | (DE) . | |
| 88 06 898 | 10/1988 | (DE) . | |
| 3905041 | 8/1990 | (DE) . | |
| WO 90/09611 | 8/1990 | (DE) | G02C/9/00 |

FOREIGN PATENT DOCUMENTS

| | | |
|---|---|---|
| 572222 | 1/1976 | (CH) . |
| 76209045 | 9/1976 | (CN) . |
| 1117593 | 2/1996 | (CN) . |

(List continued on next page.)

OTHER PUBLICATIONS

Pentax Patent Opposition Documents., (1995).
K.H.J. Buschow, A.M. van Diepen, and H.W. de Wijn: *CRYSTAL–FIELD ANISOTROPY OF $Sm^{3+}IN$ $SmCo_5$*, Solid State Communications, vol. 15, pp. 903–906, 1974.

(List continued on next page.)

* cited by examiner

*Primary Examiner*—Huy Mai
(74) *Attorney, Agent, or Firm*—Fliesler, Dubb, Meyer & Lovejoy LLP

(57) ABSTRACT

An eyeglass device includes a primary frame having two side studs. The studs each has an opening. An auxiliary frame for disposing in front of the primary frame includes two sides each having a hook member for extending over the stud and for engaging with the opening and for securing the auxiliary frame to the primary frame. The studs each includes a magnet secured in the bottom portion of the opening and the hook members are made of magnetic material for engaging with the magnets and for securing the auxiliary frame to the primary frame.

4 Claims, 1 Drawing Sheet

U.S. PATENT DOCUMENTS

| | | |
|---|---|---|
| 3919489 | 12/1990 | (DE) . |
| 3920879 | 1/1991 | (DE) . |
| 3921987 | 1/1991 | (DE) . |
| 39333310 | 1/1991 | (DE) . |
| 9216919 | 2/1993 | (DE) . |
| 43 16 698 | 11/1994 | (DE) . |
| 0469699 | 2/1992 | (EP) . |
| 0743545 | 11/1996 | (EP) . |
| 915421 | 11/1946 | (FR) . |
| 1037755 | 9/1953 | (FR) . |
| 1061253 | 4/1954 | (FR) . |
| 2483632 | 4/1981 | (FR) . |
| 1266652 | 12/1981 | (FR) . |
| 2657436 | 7/1991 | (FR) . |
| 846425 | 8/1960 | (GB) . |
| 855268 | 11/1960 | (GB) . |
| 44-15392 | 7/1969 | (JP) . |
| 54-111841 | 9/1979 | (JP) . |
| 54-111842 | 9/1979 | (JP) . |
| 55-50217 | 4/1980 | (JP) . |
| 56-29209 | 3/1981 | (JP) . |
| 57-184910 | 11/1982 | (JP) . |
| 61-2621 | 1/1986 | (JP) . |
| 1-136114 | 5/1989 | (JP) . |
| 2-109325 | 8/1990 | (JP) . |
| 5-157997 | 6/1993 | (JP) . |
| 5-40493 | 10/1993 | (JP) . |
| 7-128620 | 5/1995 | (JP) . |
| 220885 | 9/1968 | (SU) . |
| 274588 | 4/1996 | (TW) . |

OTHER PUBLICATIONS

English language abstract of Japanese Publication No. 55–50217.

English language abstract of Japanese Publication No. 54–111842.

English language abstract of Japanese Publication No.54–111841.

English language abstract of Japanese Publication No.1–136114.

English language abstract of Japanese Publication No.56–29209.

English language abstract of Japanese Publication No. 44–15392.

English language abstract of Japanese Publication No.5–157997.

English language abstract of Japanese Publication No. 612621.

English language abstract of Japanese Publication No. 5–40493.

English language abstract of German Publication No. 9216919.

English language abstract of German Publication No.1797366.

English language abstract of German Publication No.43 16 698.

English language abstract of German Publication No.39333310.

English language abstract of German Publication No.3921987.

English language abstract of German Publication No.3920879.

English language abstract of German Publication No.3919489.

English language abstract of German Publication No.3905041.

English language abstract of French Publication No.1266652.

English language abstract of French Publication No.1037755.

English language abstract of French Publication No.2,657,436.

English language abstract of French Publication No.2,483,632.

English language abstract of French Publication No.915,421.

English language abstract of Switzerland Publication No.572,222.

English language abstract of Russian Publication No.220885.

English language abstract of Taiwan Publication No.274588.

English language abstract of Chinese Publication No.1117593.

EYEGLASS DEVICE HAVING AUXILIARY FRAME

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closest prior art of which applicant is aware is U.S. Pat. No. 5,568,207 to Chao and has been assigned to the present assignee. The primary frame should be engaged with magnets for actuating with the magnets engaged in the auxiliary frame, such that the auxiliary frame may not be attached to the spectacle frame having no magnets therein.

The present invention has arisen to provide a novel configuration for securing the auxiliary frame to the primary frame.

SUMMARY OF THE INVENTION

The primary objective of the present invention is to provide an eyeglass device in which the side studs of the primary frame each includes an opening for engaging with a hook or a magnet of the auxiliary frame for solidly and stably securing the auxiliary frame to the primary frame.

In accordance with one aspect of the invention, there is provided an eyeglass device comprising a primary frame including two sides each having a stud, the studs each including an opening, and an auxiliary frame for disposing in front of the primary frame, the auxiliary frame including two sides each having a hook member for extending over the stud and for engaging with the opening and for securing the auxiliary frame to the primary frame.

The openings each includes a bottom portion, the studs each includes a first magnet secured in the bottom portion of the opening, the hook members are made of magnetic material for engaging with the first magnets and for securing the auxiliary frame to the primary frame.

The hook members each includes an extension extended rearward from the side of the auxiliary frame and extended toward the primary frame and each includes a magnetic member extended downward for engaging with the opening of the stud and for engaging with the first magnets and for securing the auxiliary frame to the primary frame. The magnetic members are magnets.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
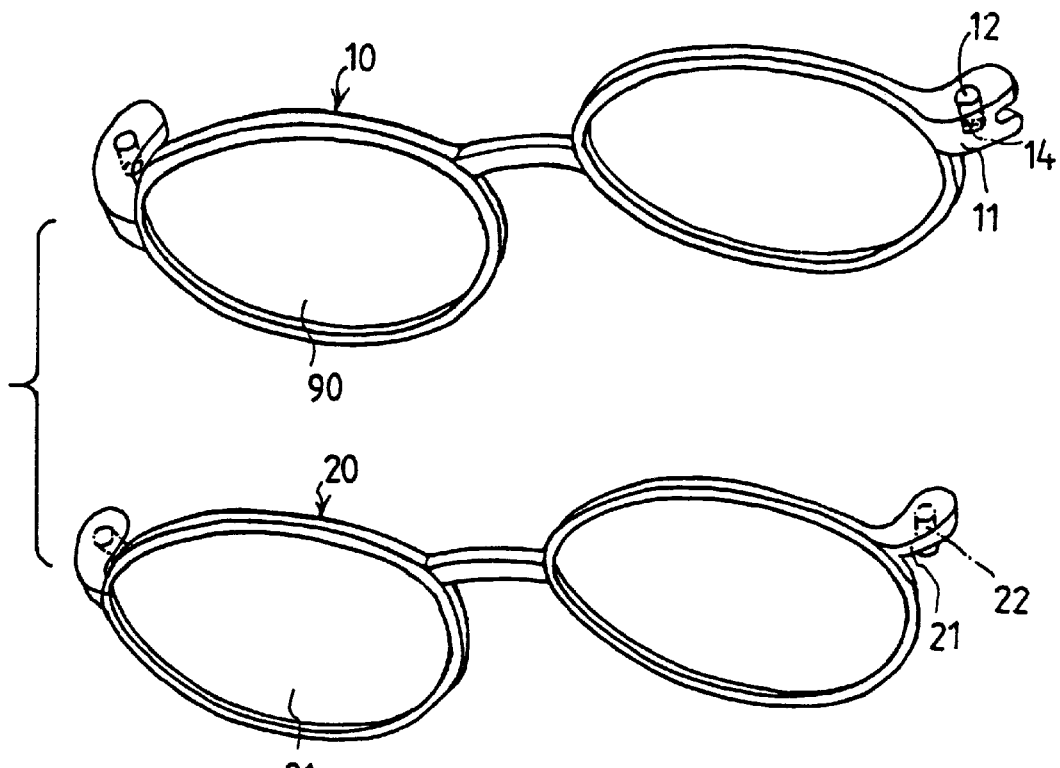
FIG. 1 is an exploded view of an eyeglass device having an auxiliary frame in accordance with the present invention.
Figure 2:
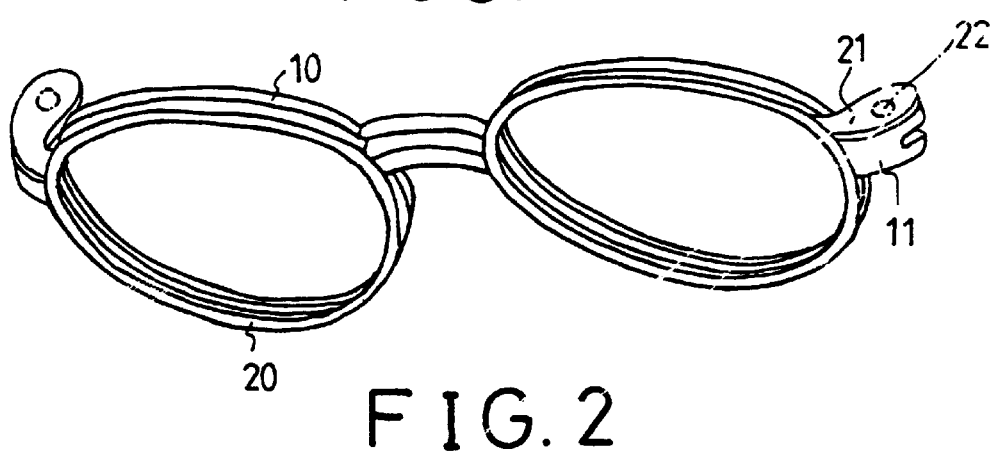
FIG. 2 is a perspective view of the eyeglass device.

Referring to the drawings, an eyeglass device in accordance with the present invention comprises a primary frame 10 for supporting primary lenses 90 and including two studs 11 formed in the side portions. The studs 11 each includes an opening 12 and each includes a magnet 14 secured in the bottom portion of the opening 12. An auxiliary frame 20 for supporting auxiliary lenses 91 and for disposing in front of the primary frame includes two extensions 21 disposed in the side portions and extended rearward for engaging over the studs 11 of the primary frame 10 respectively. The extensions 21 each includes a magnet 22 for hooking into the opening 12 of the stud 11 and for engaging with the magnet 14 of the stud 11 and for securing the auxiliary frame 20 to the primary frame 10.

It is to be noted that the extension 21 and the magnet 22 form a hooking member for engaging with the opening 12 of the stud 11 and for securing the auxiliary frame 20 to the primary frame 10.

Alternatively, the extension 21 and the magnet 22 may be formed integral as an L-shaped hook member for hooking with the opening 12. The L-shaped hook member is made of magnetic material, such as metal, for engaging with the magnet 14 of the stud 11.

Accordingly, the eyeglass device in accordance with the present invention includes a primary frame having an opening formed in each of the studs for engaging with the magnetic hooking member of the auxiliary frame and for solidly and stably securing the auxiliary frame to the primary frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass device comprising:

a primary frame including two sides each having a stud, said studs each including an opening, and an auxiliary frame for disposing in front of said primary frame, said auxiliary frame including two sides each having a hook member for extending over said stud and for engaging with said opening and for securing said auxiliary frame to said primary frame.

2. An eyeglass device according to claim 1, wherein said openings each includes a bottom portion, said studs each includes a magnet secured in said bottom portion of said opening, said hook members are made of magnetic material for engaging with said magnets and for securing said auxiliary frame to said primary frame.

3. An eyeglass device according to claim 2, wherein said hook members each includes an extension extended rearward from said side of said auxiliary frame and extended toward said primary frame and each includes a magnetic member extended downward for engaging with said opening of said stud and for engaging with said magnets and for securing said auxiliary frame to said primary frame.

4. An eyeglass device according to claim 3, wherein said magnetic members are magnets.

* * * * *